United States Patent
Shima et al.

(10) Patent No.: US 10,838,164 B2
(45) Date of Patent: Nov. 17, 2020

(54) HOLDING APPARATUS, LENS APPARATUS, AND IMAGE PICKUP APPARATUS

(71) Applicant: CANON KABUSHIKI KAISHA, Tokyo (JP)

(72) Inventors: Kenji Shima, Suntou-gun (JP); Hidenori Nakagawa, Utsunomiya (JP); Toshinori Yamazaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 15/855,262

(22) Filed: Dec. 27, 2017

(65) Prior Publication Data
US 2018/0180835 A1    Jun. 28, 2018

(30) Foreign Application Priority Data

Dec. 28, 2016  (JP) ................. 2016-256262
Dec. 13, 2017  (JP) ................. 2017-238924

(51) Int. Cl.
*G02B 7/02*    (2006.01)

(52) U.S. Cl.
CPC ............ *G02B 7/026* (2013.01); *G02B 7/022* (2013.01)

(58) Field of Classification Search
None
See application file for complete search history.

(56) References Cited

U.S. PATENT DOCUMENTS

| 6,590,720 B2* | 7/2003 | Oba ................ G02B 7/04 348/E5.028 |
| 2015/0131175 A1* | 5/2015 | Lamontagne .......... G02B 7/003 359/830 |
| 2019/0293898 A1* | 9/2019 | Hasegawa ............. G03B 17/08 |

FOREIGN PATENT DOCUMENTS

| JP | 2002267910 A | 9/2002 |
| JP | 2008233631 A | 10/2008 |

* cited by examiner

*Primary Examiner* — William R Alexander
*Assistant Examiner* — Gary W O'Neill
(74) *Attorney, Agent, or Firm* — Rossi, Kimms & McDowell LLP

(57) ABSTRACT

A holding apparatus which holds an optical element, the apparatus including: a lens barrel having an axis; and an annular pressing member configured to be screwed with the lens barrel and press the optical element against the lens barrel in a direction of the axis, wherein an engaging portion is formed in the pressing member, the engaging portion being to engage with a fastening tool for fastening the pressing member, at least a part of the engaging portion being formed, in the direction, in a region of the pressing member where the pressing member is screwed with the lens barrel.

10 Claims, 13 Drawing Sheets

HOLDING APPARATUS, LENS APPARATUS, AND IMAGE PICKUP APPARATUS

BACKGROUND OF THE INVENTION

Field of the Invention

The present invention relates to a holding apparatus that holds an optical element such as a lens or a filter, to a lens apparatus, and to an image pickup apparatus.

Description of the Related Art

Holding apparatuses with which optical elements are housed and held in lens barrels have been conventionally proposed. There is widely used a holding apparatus with such a configuration that a region in an outer peripheral portion of an optical element is held by a seat surface provided over the entire circumference of a holding member (lens barrel), and is fixed to the holding member by using an annular pressing member (pressing ring) provided with a thread in an outer peripheral portion as described in Japanese Patent Application Laid-Open No. 2008-233631. For this type of holding apparatus, as illustrated in FIG. 5 of Japanese Patent Application Laid-Open No. 2008-233631, there is generally used an assembly method of inserting a fastening tool into a tool hole provided on an optical axis direction end surface of the pressing ring and rotating and screwing the pressing ring to firmly fix the optical element.

Moreover, Japanese Patent Application Laid-Open No. 2002-267910 discloses a holding apparatus used in an exposure apparatus. Japanese Patent Application Laid-Open No. 2002-267910 provides an exposure apparatus which performs exposure at a desired resolution by using a lens having three protruding portions arranged on the same circumference at a pitch of 120 degrees and a holding apparatus including a lens holding member configured to support the lens at three points via the three protruding portions.

However, in the former conventional holding apparatuses in the section of background art, in some cases, the lens is deformed in the fixing process by rotating and screwing the pressing ring in the assembly. As a result, the optical performance is changed and the focusing performance of the entire image pickup apparatus is changed. Therefore, it is necessary to pay attention to the changes.

This problem is briefly described with reference to FIGS. 9 to 11.

FIG. 9 is a cross-sectional view of a conventional holding apparatus U100 and FIG. 10 is a view illustrating how the holding apparatus U100 is assembled and counterbalance among forces generated in a pressing ring in the assembly.

In the assembly of the holding apparatus U100, a lens 101 is housed in a lens barrel 102 and is fixed by screwing a pressing ring 103 with a lens barrel thread portion 102a and a pressing ring thread portion 103a being engaged together. A fastening tool 120 is provided with pin portions 120a at end portions of the fastening tool 120. Tool connection holes 103b are formed on a lens optical axis direction end surface of the pressing ring 103. The pin portions 120a are inserted into the tool connection holes 103b and a rotation torque T is applied to the fastening tool 120 to fasten the pressing ring 103.

The counterbalance among forces generated in the pressing ring in the fastening is described with reference to FIGS. 9 and 10.

A frictional force F102 generated in the pressing ring thread portion 103a and a frictional force F103 generated in a pressing ring lens contact portion 103c counterbalance to a fastening load F101 applied to the tool connection holes 103b by the fastening tool 120. As illustrated in FIG. 10, the pressing ring is generally fastened by using a fastening tool with such a structure that the tool comes into contact with the pressing ring at two points at a pitch of 180 degrees. Moreover, the pressing ring thread portion 103a and the pressing ring lens contact portion 103c are each formed to be substantially axisymmetric over 360° about an optical axis X of the lens. Accordingly, the frictional force F102 generated in the pressing ring thread portion 3a and the frictional force F103 generated in the pressing ring lens contact portion 103c counterbalance to the load F101 generated in the tool connection holes 103b at the two positions, the frictional forces F102 and F103 being generated over the entire circumference of 360°. Since the holding apparatus generally has a structure in which the tool connection holes 103b are provided in the optical axis direction end surface of the pressing ring 103, there is a difference in height between the generation portion of F101 and the generation portions of F102 and F103 in the optical axis direction, as illustrated by Δh in FIG. 9. Accordingly, a moment M is generated such that torsional deformation (twisting moment) occurs in the pressing ring 103 in the assembly due to the aforementioned counterbalance among forces.

FIG. 11 is a conceptual view illustrating an image of deformation of the pressing ring 103 due to the moment M generated in the assembly. FIG. 11 illustrates the pressing ring 103 as viewed in the direction indicated by the arrow V in FIG. 9. In the assembly, the pressing ring 103 is deformed almost in the figure of 8 as viewed in the direction indicated by the arrow V due to the aforementioned moment M. The lens 101 and the lens barrel 102 are also deformed due to the deformation of the pressing ring 103 almost in the figure of 8, and are kept deformed due to friction even after the fastening tool 120 is removed. As a result, residual strain is generated in the lens 101 and this causes a decrease in the optical performance.

SUMMARY OF THE INVENTION

The present invention provides, for example, a holding apparatus advantageous in an optical performance obtained thereby.

The holding apparatus holds an optical element, the apparatus including: a lens barrel having an axis; and an annular pressing member configured to be screwed with the lens barrel and press the optical element against the lens barrel in a direction of the axis, wherein an engaging portion is formed in the pressing member, the engaging portion being to engage with a fastening tool for fastening the pressing member, at least a part of the engaging portion being formed, in the direction, in a region of the pressing member where the pressing member is screwed with the lens barrel.

Further features of the present invention will become apparent from the following description of exemplary embodiments with reference to the attached drawings.

DESCRIPTION OF THE EMBODIMENTS

A Preferred embodiments of the present invention will now be described in detail in accordance with the accompanying drawings.

Embodiment 1

A holding apparatus U1 according to Embodiment 1 of the present invention is described by using FIGS. 1 to 4.

Figure 1:
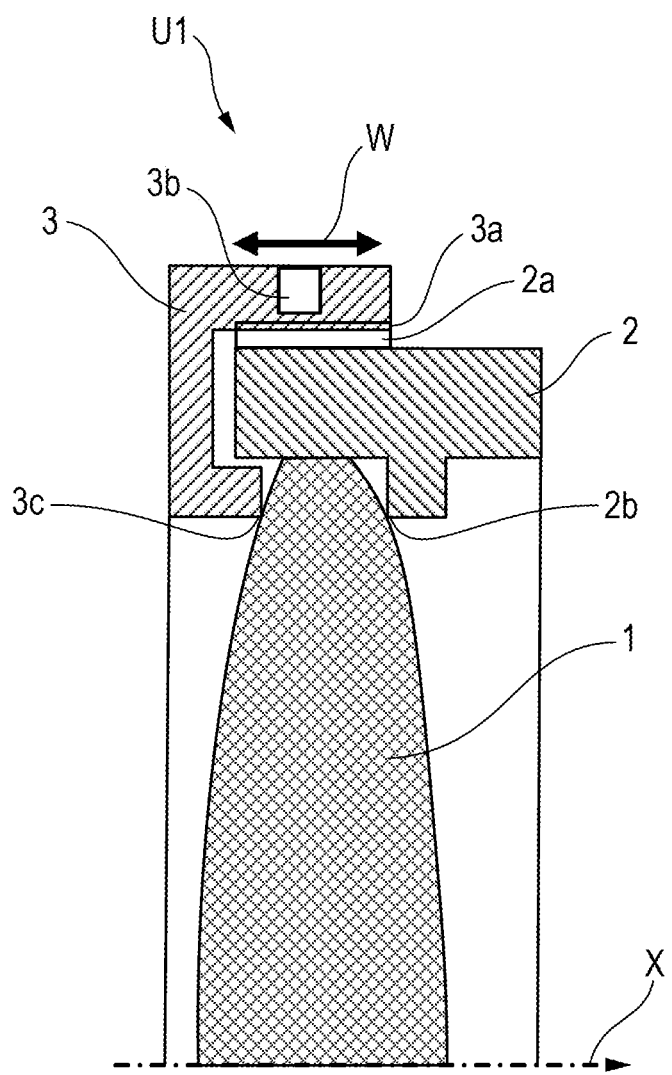
FIG. 1 is a cross-sectional view of a holding apparatus in Embodiment 1.
Figure 2:
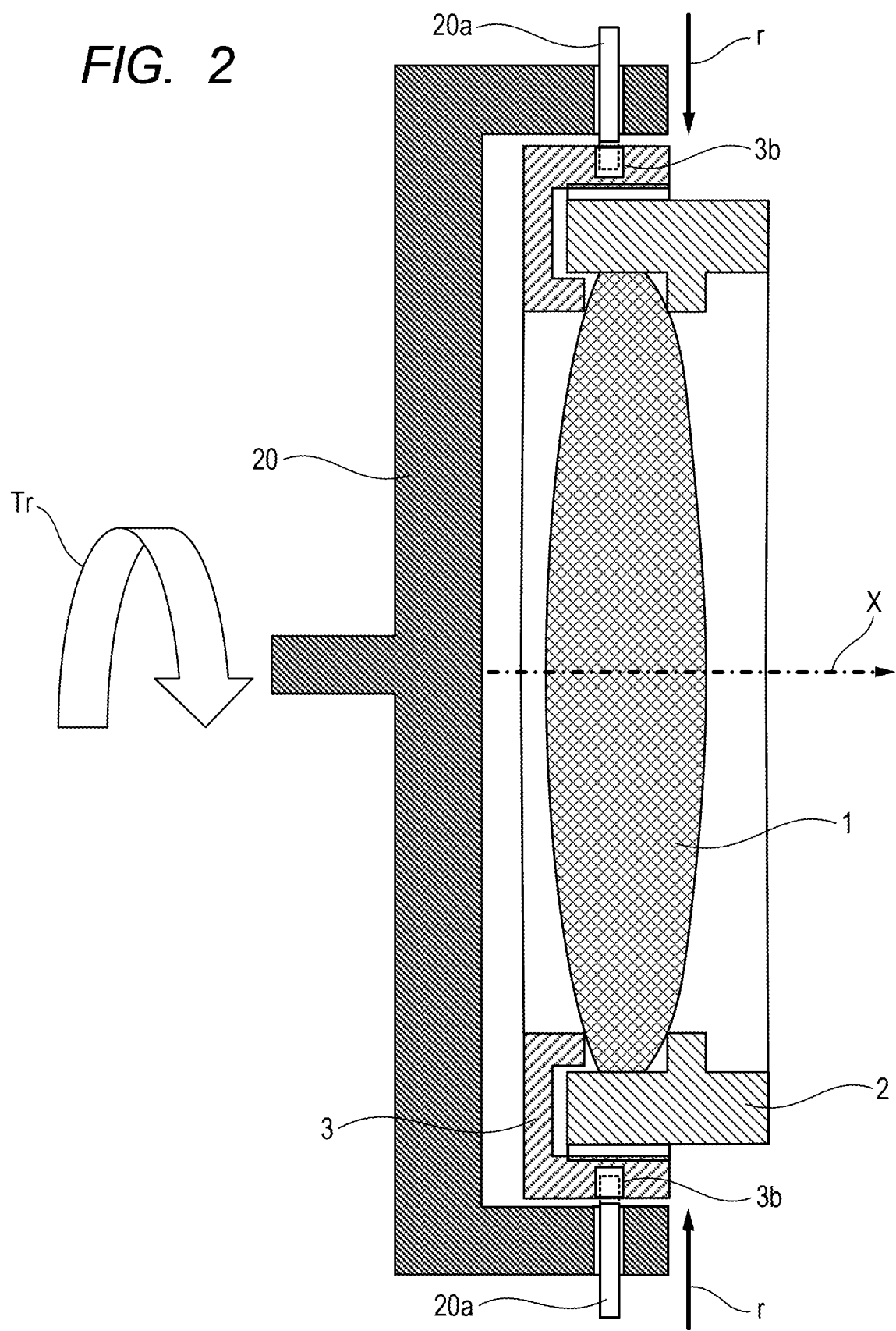
FIG. 2 is a view illustrating a fastening tool used in assembly of the holding apparatus in Embodiment 1.
Figure 3:
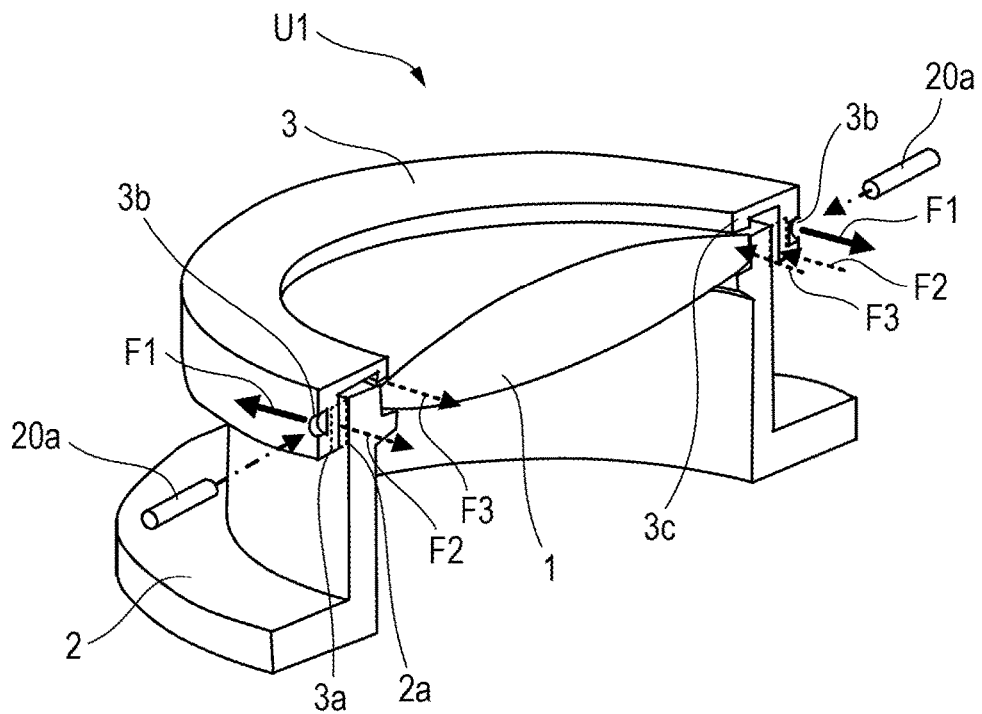
FIG. 3 is a view illustrating how the holding apparatus in Embodiment 1 is assembled.

FIG. 1 is a cross-sectional view of the holding apparatus U1 in the present embodiment. FIG. 2 is a fastening tool (fastening means) used for assembly of the holding apparatus U1 in the present embodiment. FIG. 3 is a view illustrating how the holding apparatus U1 of the present embodiment is assembled and counterbalance among forces generated in a pressing ring in the assembly.

A lens 1 housed in a lens barrel 2 is held by a pressing ring 3 which is a pressing member. Reference sign X denotes an optical axis of the lens 1, and the lens barrel 2 and the pressing ring 3 are annular structures having shapes substantially axisymmetric about the optical axis X. The pressing ring 3 is provided with a pressing ring thread portion 3a with an internal thread, and the pressing ring thread portion 3a engages with a lens barrel thread portion 2a with an external thread which is provided in the lens barrel. Moreover, the pressing ring 3 has a pressing ring lens contact portion 3c, and the pressing ring lens contact portion 3c is in contact with the lens 1 after the completion of assembly. Furthermore, hole portions 3b are formed at two opposing positions in an outer peripheral side surface (an outer surface) of the pressing ring and are used as tool holes (engaging portions) in fastening of the pressing ring 3. The hole portions 3b are formed in a radial direction of the pressing ring thread portion 3a to be located in a region W including the pressing ring thread portion 3a and the pressing ring lens contact portion 3c in an optical axis direction (X direction in the drawings, the axial direction of the pressing ring thread portion 3a). In FIG. 2, reference numeral 20 denotes the fastening tool, and pin portions 20a are provided in end portions of the fastening tool 20. The pin portions 20a have structures movable in the directions indicated by the arrows r in FIG. 2.

A method of assembling the holding apparatus U1 in the present embodiment is described by using FIGS. 2 and 3. Note that, in FIG. 3, the entire fastening tool 20 is not illustrated and instead only the pin portions 20a are illustrated to facilitate the understanding of the structure.

The lens 1 is housed in the lens barrel 2 and the lens barrel thread portion 2a and the pressing ring thread portion 3a are engaged to temporarily fix the pressing ring 3 at a predetermined position. In a fastening step of the pressing ring 3, a fastening torque Tr is applied to the fastening tool 20 with the pin portions 20a of the fastening tool 20 inserted in the hole portions (engaging portions) 3b. The pressing ring 3 is thereby screwed to the lens barrel 2 and the pressing ring lens contact portion 3c comes into contact with the lens 1. The lens 1 is thus pressed against the lens barrel 2 (held between the pressing ring lens contact portion 3c and a contact portion 2b of the lens barrel 2) and is firmly held. After the fastening is performed at a predetermined fastening torque, the pin portions 20a are removed from the hole portions 3b and the fastening step of the pressing ring 3 is completed.

Next, description is given of counterbalance among forces generated in the pressing ring in the fastening thereof by using FIG. 2.

A frictional force F2 generated in the pressing ring thread portion 3a and a frictional force F3 generated in the pressing ring lens contact portion 3c counterbalance to a fastening load F1 applied to the hole portions 3b by the fastening tool 20. As described above, the hole portions 3b are provided at the two opposing positions in the outer peripheral side surface of the pressing ring 3, and the pressing ring thread portion 3a and the pressing ring lens contact portion 3c are each provided to be substantially axisymmetric over 360° about the optical axis X. The frictional force F2 generated in the pressing ring thread portion 3a and the frictional force F3 generated in the pressing ring lens contact portion 3c counterbalance to the fastening load F1 generated in the hole portions 3b at the two positions, the frictional forces F2 and F3 being generated over the entire circumference of 360°. Here, as described above, the hole portions 3b are arranged in the region W including the pressing ring thread portion 3a and the pressing ring lens contact portion 3c in the optical axis direction. Accordingly, it is less likely that a torsional moment is generated due to a difference in the position in the optical axis direction between the portions where the fastening load is applied and the portions where the frictional forces are generated as in the conventional holding apparatus described in "Description of the Related Art," and torsional deformation (twisting moment) of the pressing ring 3 in the fastening can be reduced. Hence, deformation of the lens 1 and the lens barrel 2 due to the effect of the deformation of the pressing ring 3 in the fastening is reduced and the deformation of the lens 1 remaining after the removal of the fastening tool 20 can be reduced.

Next, description is given of a result of a simulation by a finite element method performed by using a computer and commercially-available analysis software to confirm effects of the present invention. Mesh models of the lens barrel, the lens, and the pressing ring were created and deformation analysis considering contact was performed under a condition that a predetermined fastening torque was applied to the pressing ring with the lens barrel being restrained. Note that mesh models expressing the thread shapes of the lens barrel thread portion and the pressing ring thread portion in detail were used for the calculation.

Figure 4:
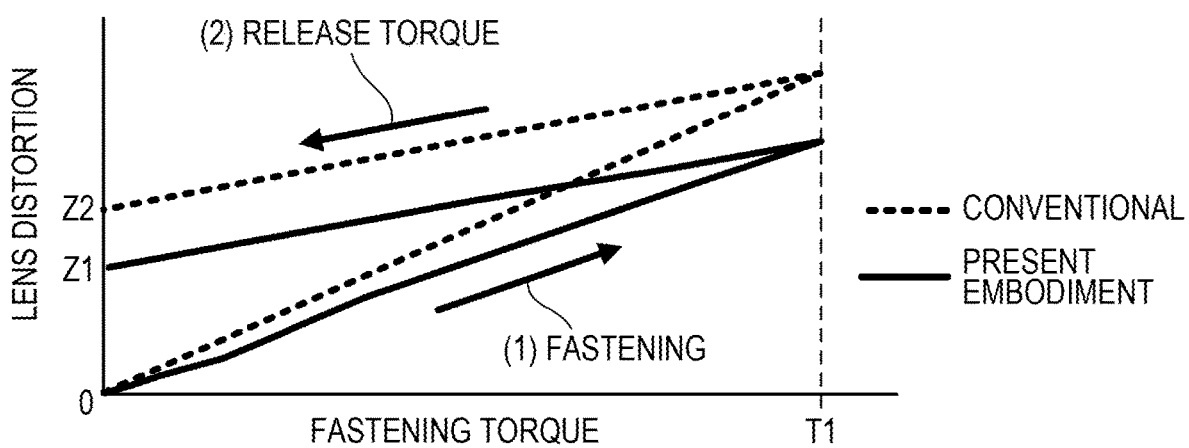
FIG. 4 is a graph explaining a deformation reduction effect of the holding apparatus of the present invention.

FIG. 4 is a graph depicting a relation between the fastening torque and the lens distortion which is extracted from the analysis result by data processing. The horizontal axis represents the fastening torque and the vertical axis represents the lens distortion. The lens distortion is defined by using a difference between the maximum value and the minimum value of optical axis direction displacement at a node on a surface of the lens on one side. In this analysis, as illustrated in FIG. 4, a calculation step of applying a fastening torque up to a predetermined set torque T1 is set. Then a calculation step of releasing the fastening torque is set. The fastening step of the pressing ring in the assembly of the holding apparatus is thereby reproduced, and the residual strain in the lens generated by the effect of friction is expressed.

As load conditions, the fastening torque is set to be applied to portions corresponding to the hole portions 3b described in the present embodiment for the model of the present embodiment and to portions corresponding to the tool connection holes 103b described in "Description of the Related Art" for the model of the conventional example.

As apparent from FIG. 4, by comparing the lens distortion remaining after the completion of fastening of the pressing ring at the same set torque of T1, it is found that the lens distortion Z1 in the holding apparatus of the present embodiment is suppressed to about 70% of the lens distortion Z2 in the conventional holding apparatus. The effect of reducing the lens deformation due to the fastening of the pressing ring described in the present embodiment can be thus confirmed from this analysis result.

Note that the aforementioned simulation result is a result of evaluating one example of the holding apparatus to which the present invention is applied. The lens deformation amount, the deformation reduction effect by the application of the present invention, and the like vary from those in the description of the present embodiment depending on various parameters such as the shapes and materials of the lens, the lens barrel, the pressing ring, and the like, as matter of course.

Next, modified examples of the holding apparatus in the present embodiment are described with reference to FIGS. 5 and 6. Although the mode in which the pressing ring is fastened by using the hole portions 3b provided in the pressing ring has been described above in detail in the present embodiment, the gist of the present invention is not limited to this mode. That is, though an example in which a pressing ring is provided with the hole portions 3b serving as an engaging portion engaging with the fastening tool for fastening of the pressing ring (pressing member or fastening member) is described, the engaging portion is not limited to the hole portion and can be one as exemplified as follows.

Figure 5:
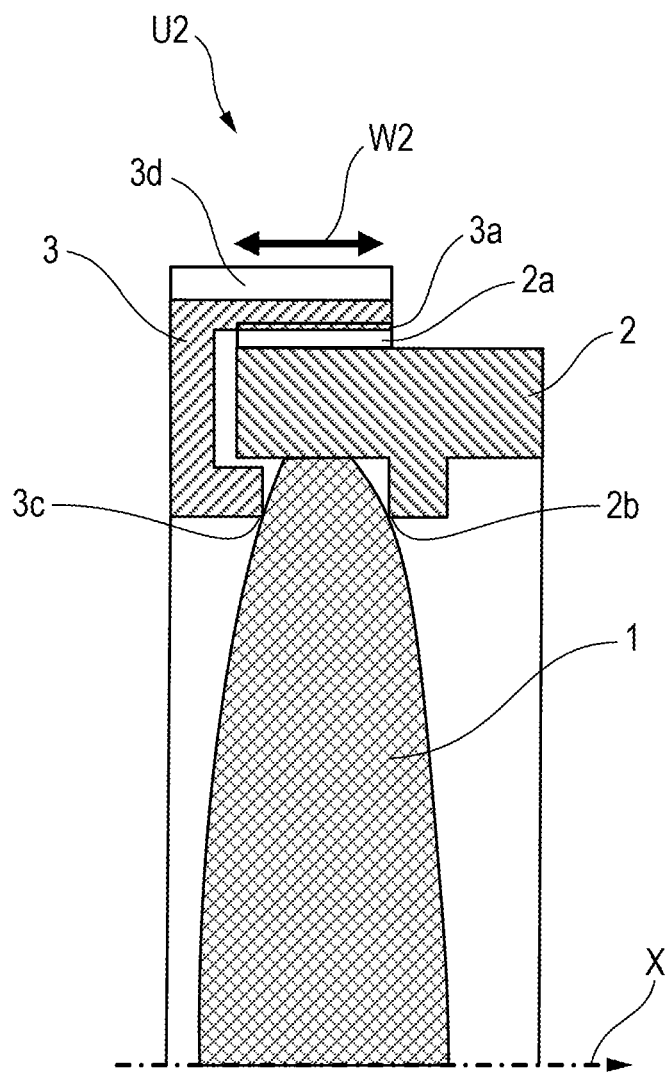
FIG. 5 is a view illustrating a modified example of the holding apparatus in Embodiment 1.

For example, FIG. 5 is a cross-sectional view of a holding apparatus U2 in a first modified example of the present embodiment. Since the basic configuration of the holding apparatus U2 is the same as that of the holding apparatus U1 described above in detail in the present embodiment, detailed description is omitted. Groove portions 3d are formed at two opposing positions in the outer peripheral side surface of the pressing ring 3 to extend in the axial direction of the pressing ring thread portion (lens barrel thread portion), and are used as the fastening tool contact portions (engaging portions) in the fastening of the pressing ring 3. The groove portions 3d are arranged in a region W2 including the pressing ring thread portion 3a and the pressing ring lens contact portion 3c in the optical axis direction, as in the aforementioned holding apparatus U1.

As described above, the groove portions 3d are arranged at least partially in the region W2 including the pressing ring thread portion 3a and the pressing ring lens contact portion 3c regarding the optical axis direction. Accordingly, it is less likely that a torsional moment is generated due to a difference in the position in the optical axis direction between the portions where the fastening load is applied and the portions where the frictional forces are generated as in the conventional holding apparatus described in "Description of the Related Art," and torsional deformation (twisting moment) of the pressing ring 3 in the fastening can be reduced.

Figure 6:
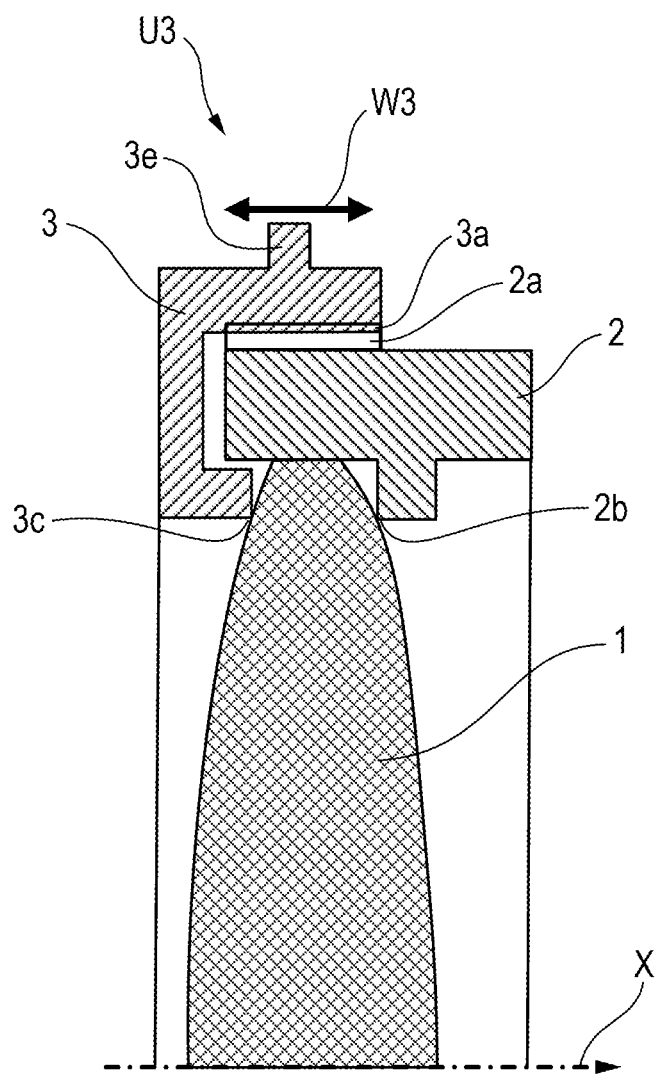
FIG. 6 is a view illustrating another modified example of the holding apparatus in Embodiment 1.

FIG. 6 is a cross-sectional view of a holding apparatus U3 in a second modified example of the present embodiment. Since the basic configuration of the holding apparatus U3 is the same as that of the holding apparatus U1 described above in detail in the present embodiment, detailed description is omitted. Projecting portions 3e are formed at two opposing positions in the outer peripheral side surface of the pressing ring 3 to project from the outer peripheral side surface in the radial direction of the pressing ring thread portion 3a, and are used as the fastening tool contact portions (engaging portions) in the fastening of the pressing ring 3. The projecting portions 3e are arranged in a region W3 including the pressing ring thread portion 3a and the pressing ring lens contact portion 3c in the optical axis direction, as in the aforementioned holding apparatus U1.

As described above, the projecting portions 3e are arranged in the region W3 including the pressing ring thread portion 3a and the pressing ring lens contact portion 3c in the optical axis direction. Accordingly, it is less likely that a torsional moment is generated due to a difference in the position in the optical axis direction between the portions where the fastening load is applied and the portions where the frictional forces are generated as in the conventional holding apparatus described in "Description of the Related Art," and torsional deformation of the pressing ring 3 in the fastening can be reduced.

An ideal condition of screwing the pressing ring 3 to the lens barrel 2 and pressing the lens 1 with the pressing ring lens contact portion 3c of the pressing ring 3 is such a condition that the pressing ring 3 is not deformed by the force applied to the pressing ring 3 by the fastening tool and the contact portion of the pressing ring 3 thereby presses the lens 1 at an uniform pressing force. Specifically, the ideal condition is a condition in which portions where the fastening tool 20 applies force to the pressing ring 3 are distributed as evenly as possible over the pressing ring 3 and the force is uniformly applied. As a method of achieving this condition, it is conceivable to design a pressing ring with stiffness so high that strain generated in a range of force to be used is within an allowable range. Meanwhile, a lens apparatus (an optical apparatus) generally includes multiple lenses to satisfy a required optical performance and the holding mechanism of the present invention is used for each of the lenses. Accordingly, in many cases, it is difficult to increase the thickness of the pressing ring 3 in the optical axis direction. Hence, in many cases, it is difficult to achieve a pressing ring with stiffness so high that, when the fastening force is applied with the tool connection holes 103b being the point of effort as in the conventional technique, deformation occurs only at a level not affecting the optical performance.

Moreover, when the pressing ring 3 is screwed to the lens barrel 2 and the lens 1 is pressed with the pressing ring lens contact portion 3c, drag against the force (fastening load F1) causing the pressing ring 3 to rotate relative to the lens barrel 2 in a circumferential direction include the frictional force F2 of the pressing ring thread portion 3a and the frictional force F3 of the pressing ring lens contact portion 3c. Due to reasons such as a contact area between the lens barrel thread portion 2a and the pressing ring thread portion 3a being larger than a contact area between the pressing ring lens contact portion 3c and the lens, the frictional force F2 generated in the pressing ring thread portion 3a is dominant as the draft in many cases. Accordingly, when the fasting force is applied to the hole portions 3b, the groove portions 3d, 4f, the projecting portions 3e, or the like (point of effort), since the distance between the point of effort and the contact portion between the lens barrel thread portion 2a and the pressing ring thread portion 3a is shorter than that in the fastening using the tool connection holes 103b in the conventional example, the moment can be reduced. Specifically, the configuration of the present invention in view of this is such that the point of effort such as the hole portions 3b, the groove portions 3d, 4f, and the projecting portions 3e is arranged within a region in which the lens barrel thread portion 2a and the pressing ring thread portion 3a are in contact with each other in the axial direction of the pressing ring thread portion. This can suppress torsional deformation of the pressing ring 3 compared to the conventional type and the holding apparatus can hold the lens while pressing it at more uniform pressing force.

In the holding apparatus of the present embodiment, any of the hole portions, the groove portions, and the projecting portions can be selected to be provided in the pressing ring, depending on structural restrictions of a product and convenience of manufacturing.

Moreover, in the present embodiment, description is given of the configuration in which the hole portions, the groove portions, and projecting portions used for the fastening of the pressing ring are formed at the two opposing positions in the outer peripheral side surface of the pressing ring, that is at a pitch of 180 degrees. However, the gist of the present invention is not limited to this, and any number of the hole portions, the groove portions, or projecting portions may be formed at any intervals such as, for example, a 90 degree pitch or a 60 degree pitch. In the assembly of the holding apparatus, work based on the knowing of a worker such as first loosely fastening the pressing ring and then further fastening the pressing ring with the contact position of the fastening tool changed can be performed to further reduce the deformation of the pressing ring in the fastening and further improve the effect of the present invention.

As described above, the holding apparatus which can reduce the deformation of the lens due to the fastening of the pressing ring and in which the optical performance is less likely to decrease can be provided by applying the holding apparatus of the present embodiment.

Embodiment 2

Figure 7:
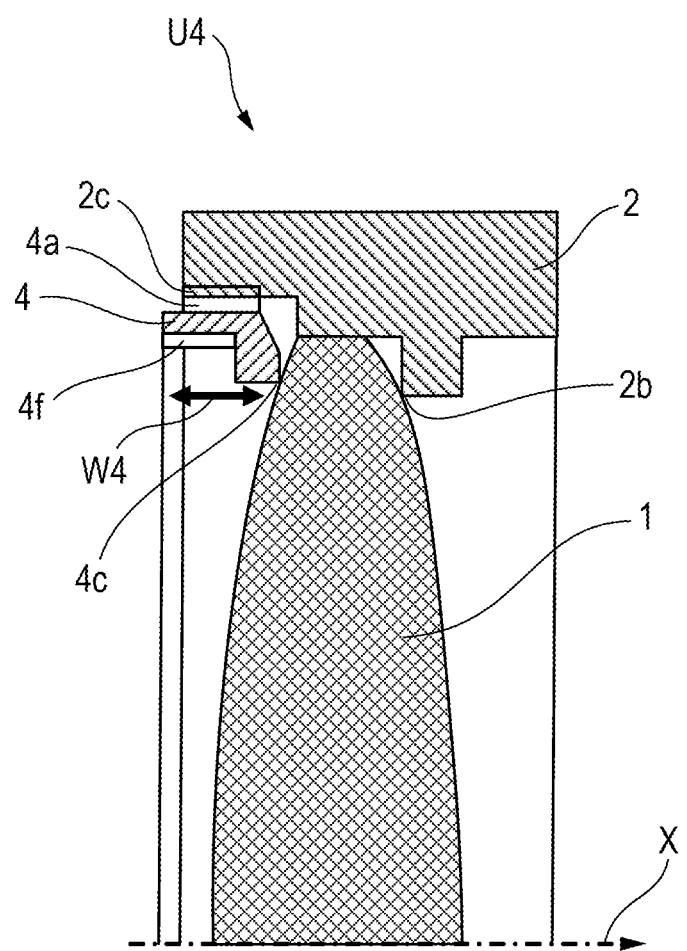
FIG. 7 is a cross-sectional view of a holding apparatus in Embodiment 2.

A holding apparatus U4 according to the present embodiment is described by using FIG. 7.

In Embodiment 1, description is given of the holding apparatus of a so-called outer thread lens barrel type structure in which the external thread is formed in an outer peripheral portion of the lens barrel and the internal thread is formed in an inner peripheral portion of the pressing ring. However, the gist of the present invention is not limited to this and the present invention can be applied also to a holding apparatus of a so-called inner thread lens barrel type in which the internal thread is formed in an inner peripheral portion of the lens barrel and the external thread is formed in an outer peripheral portion of the pressing ring.

FIG. 7 is a cross-sectional view of the holding apparatus U4 according to the present embodiment.

The lens 1 housed in the lens barrel 2 is held by a pressing ring 4 which is the pressing member. Reference sign X denotes the optical axis of the lens 1, and the lens barrel 2 and the pressing ring 4 are annular structures having shapes substantially axisymmetric about the optical axis X. The pressing ring 4 is provided with a pressing ring thread portion 4a with an external thread and engages with a lens barrel thread portion 2c with an internal thread which is provided in the lens barrel. Moreover, the pressing ring 4 has a pressing ring lens contact portion 4c and the pressing ring lens contact portion 4c is in contact with the lens 1 after the completion of assembly. Furthermore, groove portions 4f are formed at two opposing positions in an inner peripheral side surface (an inner surface) of the pressing ring 4 and are used as the fastening tool contact portions (engaging portions) in fastening of the pressing ring 4. The groove portions 4f are arranged at least partially in a region including the pressing ring thread portion 4a and the pressing ring lens contact portion 4c in the optical axis direction.

In the holding apparatus U4 in the present embodiment, as described above, the groove portions 4f are arranged at least partially in a screw region W4 including the pressing ring thread portion 4a and the pressing ring lens contact portion 4c in the optical axis direction. Accordingly, as in Embodiment 1, it is less likely that a torsional moment is generated due to a difference in the position in the optical axis direction between the portions where the fastening load is applied and the portions where the frictional forces are generated as in the conventional holding apparatus, and torsional deformation of the pressing ring 4 in the fastening can be reduced. Hence, deformation of the lens 1 and the lens barrel 2 due to the effect of deformation of the pressing ring 4 in the fastening is reduced and the deformation of the lens 1 remaining after the completion of fastening can be reduced.

Moreover, the groove portions 4f provided in the pressing ring 4 can be changed to hole portions or projecting portions depending on structural restrictions of a product and convenience of manufacturing, as in Embodiment 1.

The configuration of the present embodiment can reduce the deformation of the lens caused by the fastening of the pressing ring in the holding apparatus of the so-called inner thread lens barrel type in which the internal thread is formed in the inner periphery of the lens barrel and the external thread is formed in the outer periphery of the pressing ring, and the holding apparatus in which a decrease in the optical performance is suppressed can be provided.

Embodiment 3

Figure 8:
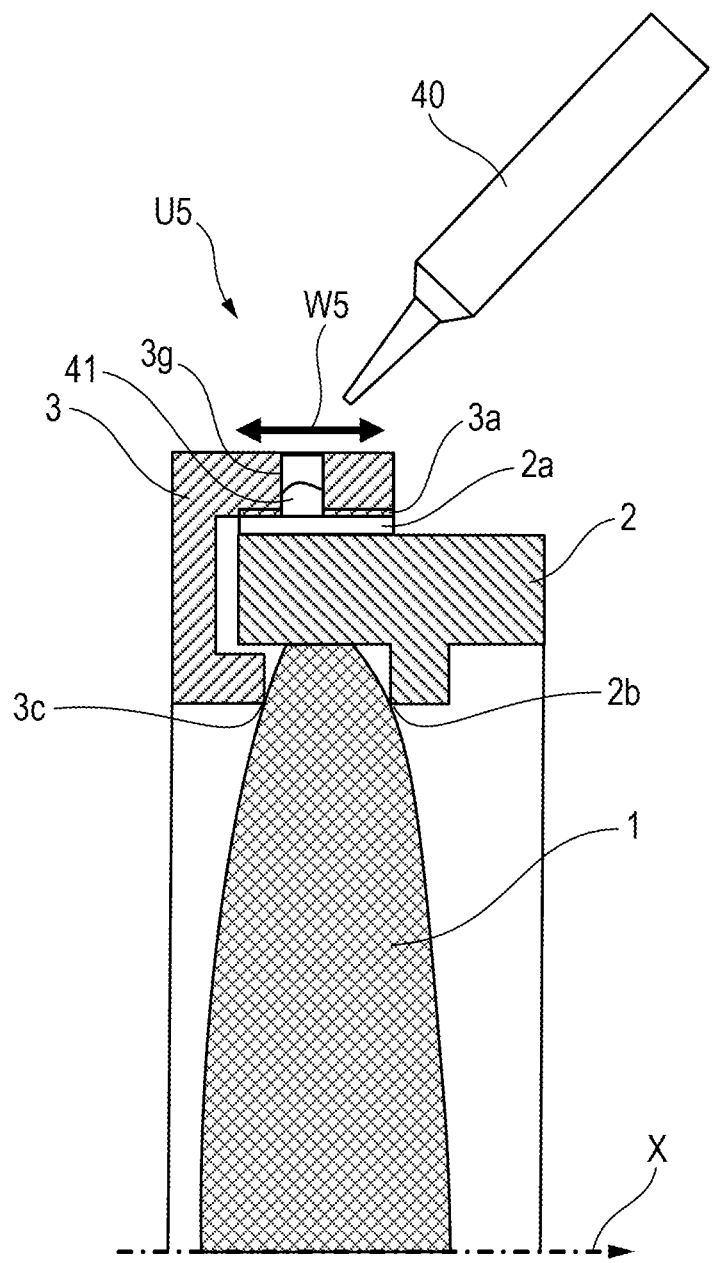
FIG. 8 is a cross-sectional view of a holding apparatus in Embodiment 3.
Figure 9:
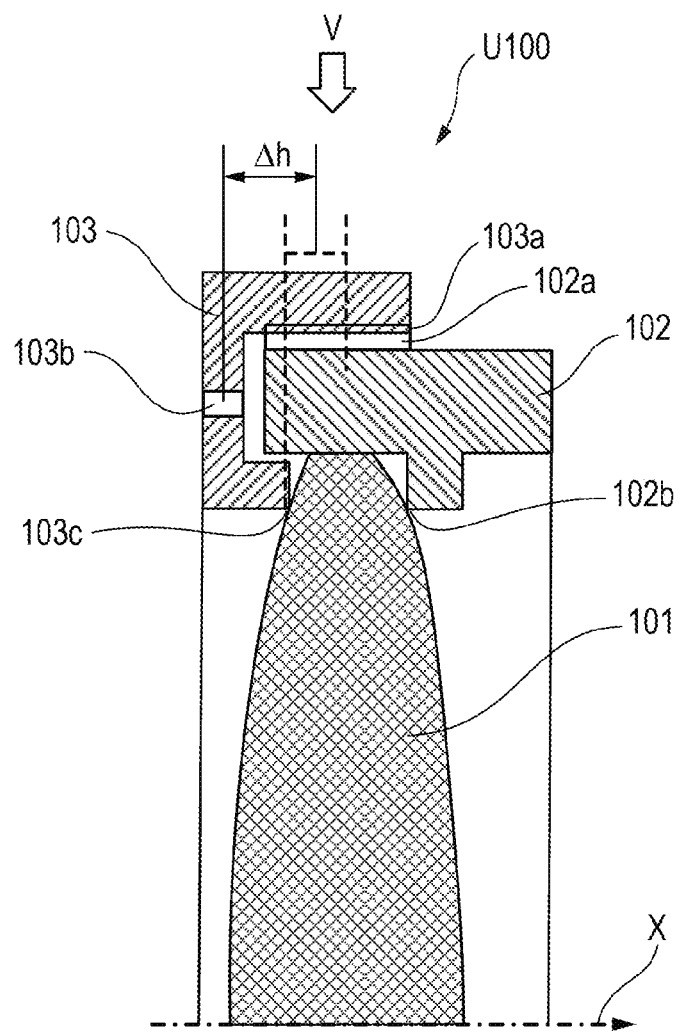
FIG. 9 is a cross-sectional view of a conventional holding apparatus.
Figure 10:
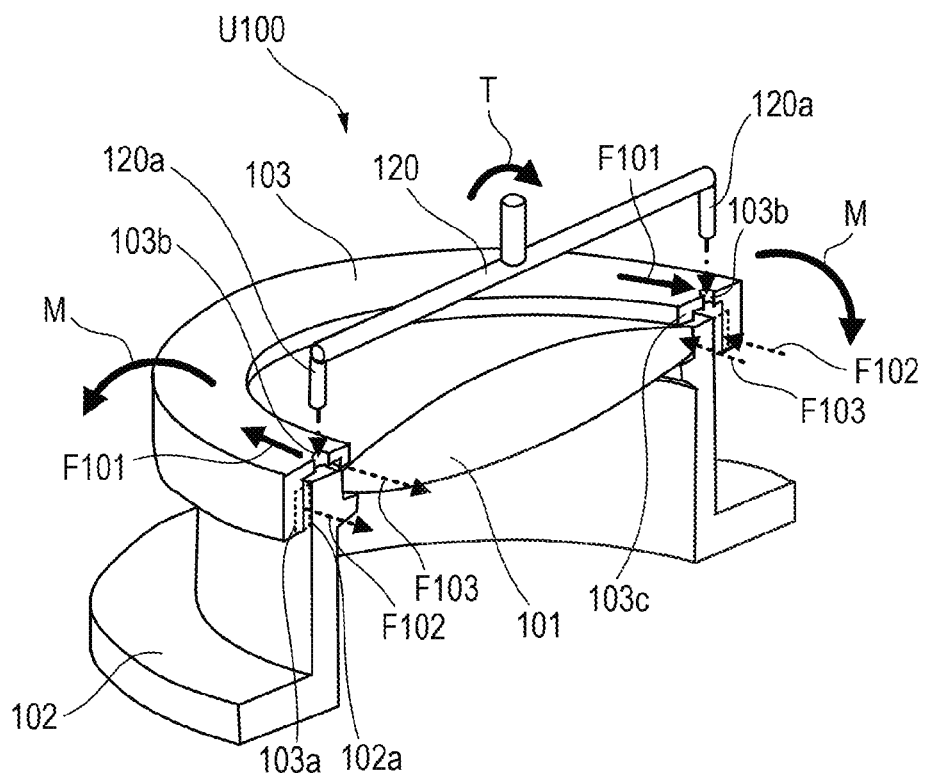
FIG. 10 is a view illustrating how the conventional holding apparatus is assembled.
Figure 11:
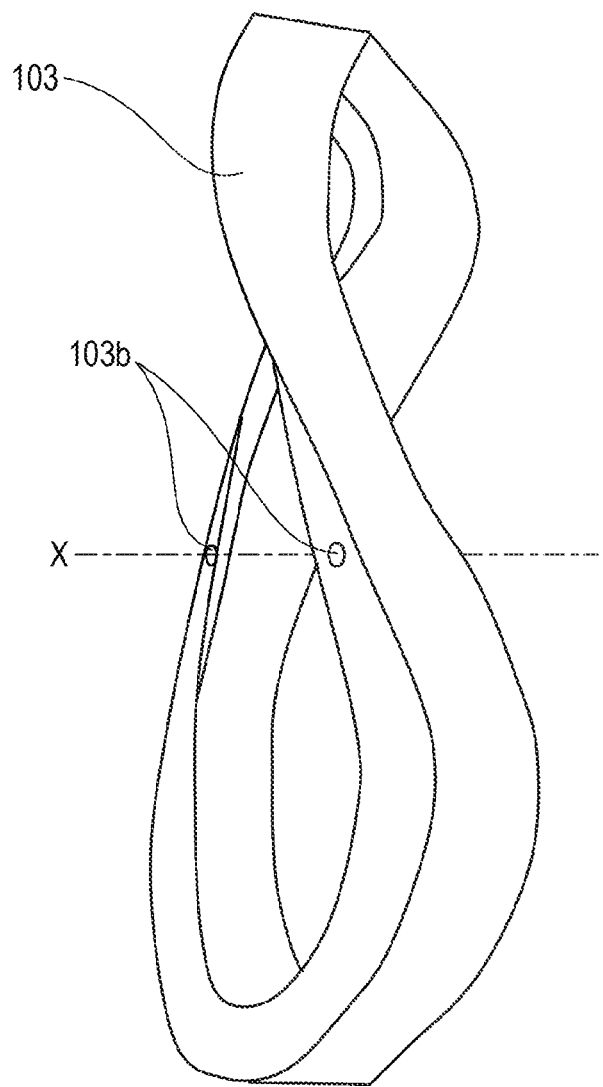
FIG. 11 is a conceptual view of a deformation state of a pressing ring in fastening.

A holding apparatus U5 according to the present embodiment is described by using FIG. 8.

Note that since the basic structure of the holding apparatus U5 is the same as that of the holding apparatus described in Embodiment 1, the same constitutional elements are denoted by the same reference numerals and detailed description thereof is omitted herein.

Through holes 3g are provided at two opposing positions in an outer peripheral side surface of the pressing ring 3 used in the holding apparatus U5 of the present embodiment. The through holes 3g are arranged in a region W5 including the pressing ring thread portion 3a and the pressing ring lens contact portion 3c in the optical axis direction. In the assembly, the through holes 3g are first used as the fastening tool contact portions (engaging portions) as in the description of Embodiment 1 to fasten and fix the pressing ring 3. Then, adhesive 41 is applied to the through holes by using an adhesive application device 40 to prevent the pressing ring from loosening after the completion of assembly, and the lens barrel thread portion 2a and the pressing ring thread portion 3a are bonded and fixed. Specifically, in the holding apparatus of the present embodiment, the through holes 3g provided in the pressing ring 3 are configured to function as both of tool holes used for the fastening of the pressing ring and adhesive application portions.

In the holding apparatus U5 in the present embodiment, as described above, the through holes 3g are arranged in the region W5 including the pressing ring thread portion 3a and the pressing ring lens contact portion 3c in the optical axis direction. Accordingly, as in the holding apparatus U1 described in Embodiment 1, it is less likely that a torsional moment is generated due to a difference in the position in the optical axis direction between the portions where the fastening load is applied and the portions where the frictional forces are generated as in the conventional holding apparatus, and torsional deformation of the pressing ring 3 in the fastening can be reduced. Hence, deformation of the lens 1 and the lens barrel 2 due to the effect of the deformation of the pressing ring 3 in the fastening is reduced and the deformation of the lens 1 remaining after the completion of fastening can be reduced. Furthermore, as described above, the strength of holding the lens 1 by the pressing ring 3 can be improved by applying the adhesive 41 to the lens barrel thread portion 2a and the pressing ring thread portion 3a by using the through holes 3g.

As described above, the deformation of the lens due to the fastening of the pressing ring can be reduced by applying the holding apparatus of the present embodiment, and the holding apparatus in which a decrease in the optical performance is less likely to occur and which has high lens holding strength and excellent impact resistance can be provided.

In each of the embodiments, description is given of the case where the optical element held by the holding apparatus of the present invention is a single lens, but the present invention is not limited to this case. The present invention can be similarly applied to optical elements other than the single lens which form an optical system in a lens barrel of a lens apparatus. For example, the effects of the present invention can be similarly obtained also in the cases where the holding apparatus holds units such as a stop unit, a filter, and an image stabilizer supporting an image stabilizing lens movable in directions having components perpendicular to the optical axis.

A lens apparatus having the effects of the present invention can be provided by forming a lens apparatus including an optical element held by the holding apparatus of the present invention. Moreover, an image pickup apparatus (an optical apparatus) having the effects of the present invention can be provided by a lens apparatus which has an optical element held by the holding apparatus of the present invention and a camera apparatus including an image pickup element which receives an optical image formed by the lens apparatus.

Although the preferable embodiments of the present invention have been described above, the present invention is not limited to these embodiments as matter of course and various modifications and changes can be made within the gist of the present invention. For example, the fastening tool 20 illustrated in Embodiment 1 can be changed as follows to match each of the first modified example of Embodiment 1, the second modified example of Embodiment 1, and Embodiment 2.

Figure 12:
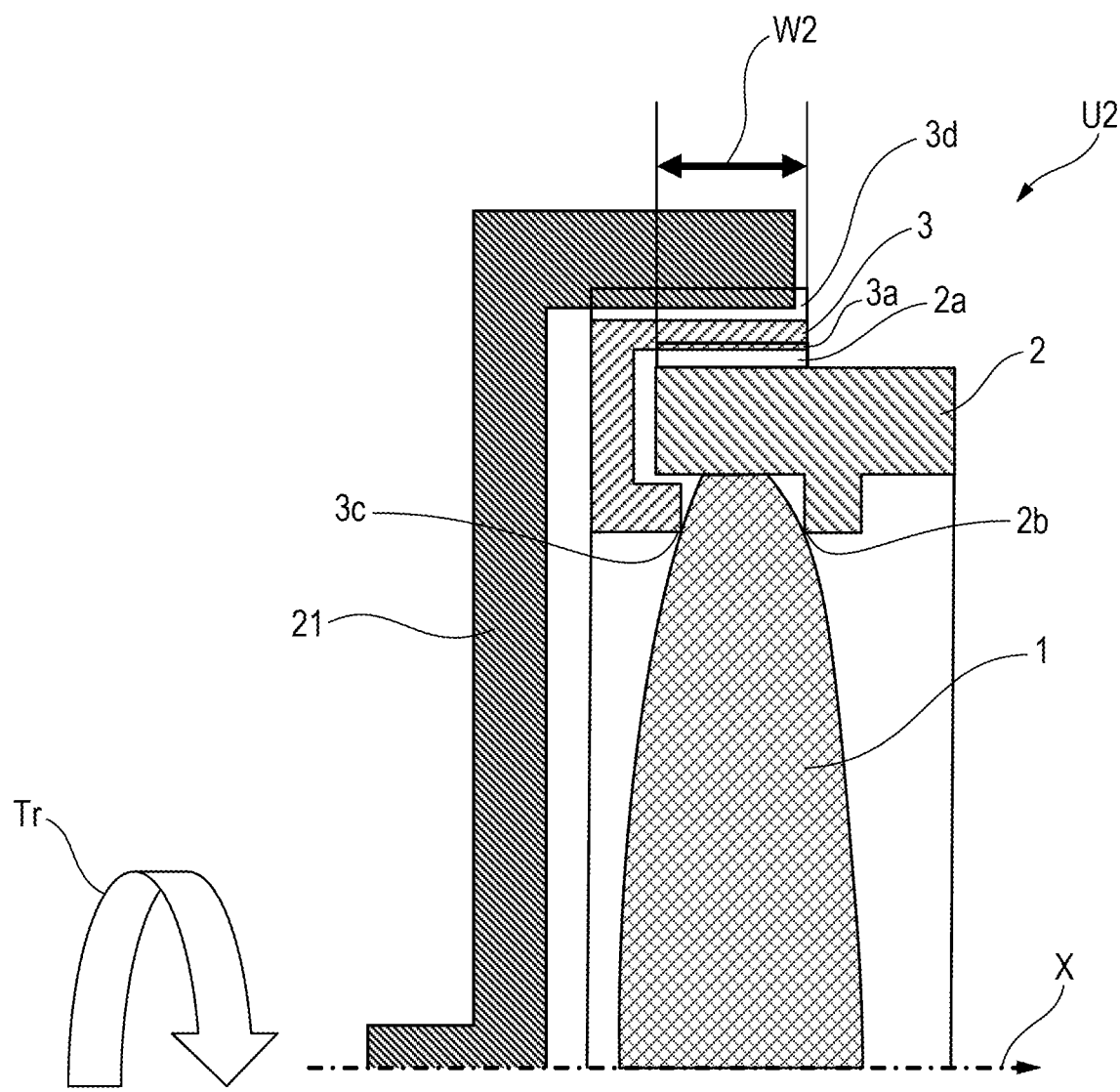
FIG. 12 is a view illustrating a fastening tool relating to the first modified example of Embodiment 1.

FIG. 12 is a view illustrating a fastening tool relating to the first modified example of Embodiment 1. In FIG. 12, the fastening tool 21 is configured such that portions (protruding portions) of the fastening tool 21 engage with the aforementioned groove portions 3d formed in the pressing ring 3. It is only necessary to apply the fastening torque Tr to the fastening tool 21 in this engagement state. The pressing ring 3 is thereby screwed to the lens barrel 2 and the contact portion 3c of the pressing ring 3 comes into contact with the lens 1. The lens 1 is thus pressed against the lens barrel 2 (held between the contact portion 3c and the contact portion 2b of the lens barrel 2) and is firmly held by the lens barrel 2.

Figure 13:
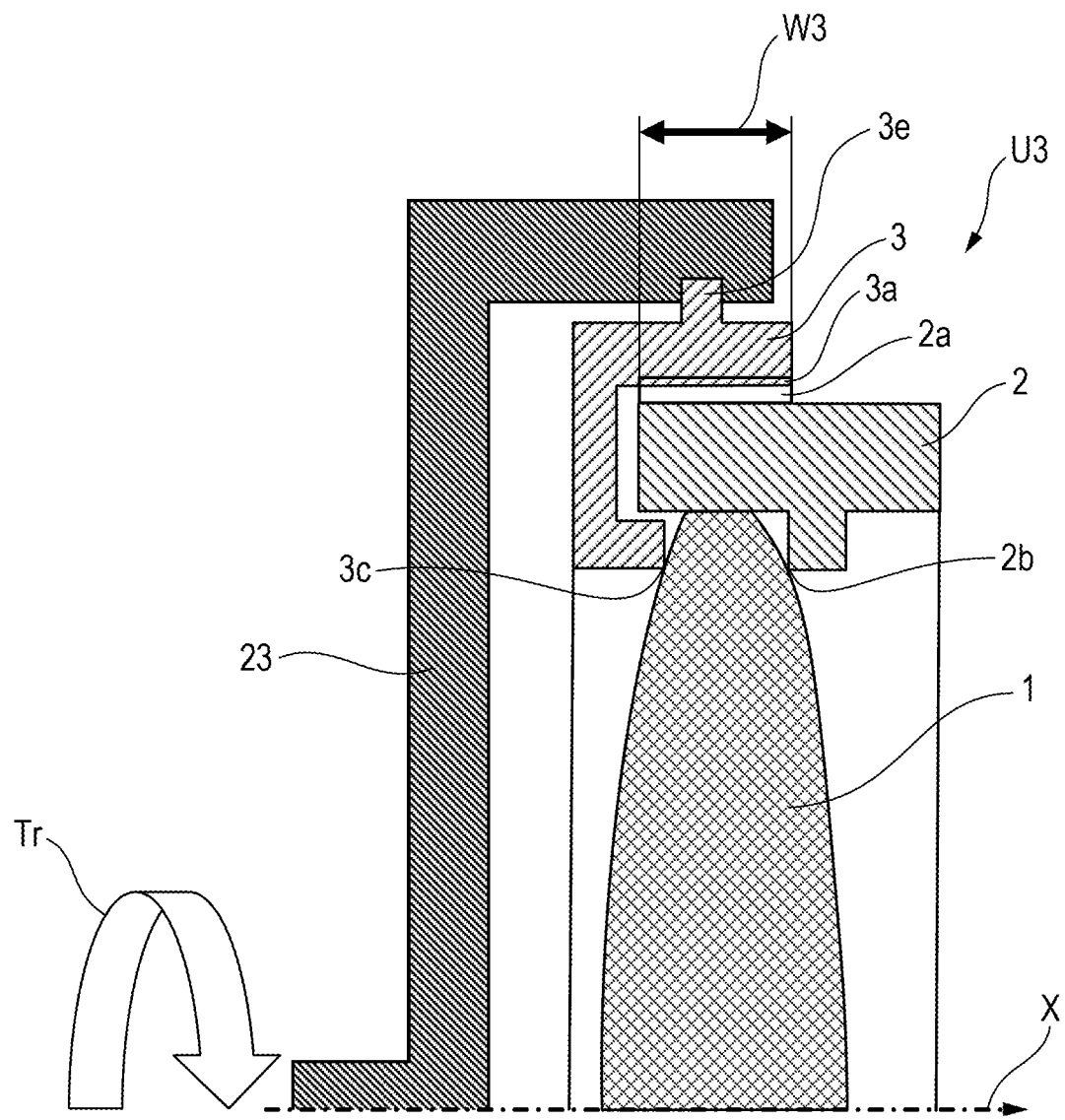
FIG. 13 is a view illustrating a fastening tool relating to the second modified example of Embodiment 1.

Furthermore, FIG. 13 is a view illustrating a fastening tool relating to a second modified example of Embodiment 1. In FIG. 13, the fastening tool 22 is configured such that recessed portions of the fastening tool 22 engage with the aforementioned projecting portions 3e formed in the pressing ring 3. It is only necessary to apply the fastening torque Tr to the fastening tool 22 in this engagement state. The pressing ring 3 is thereby screwed to the lens barrel 2 and the contact portion 3c of the pressing ring 3 comes into contact with the lens 1. The lens 1 is thus pressed against the lens barrel 2 (held between the contact portion 3c and the contact portion 2b of the lens barrel 2) and is firmly held by the lens barrel 2.

Figure 14:
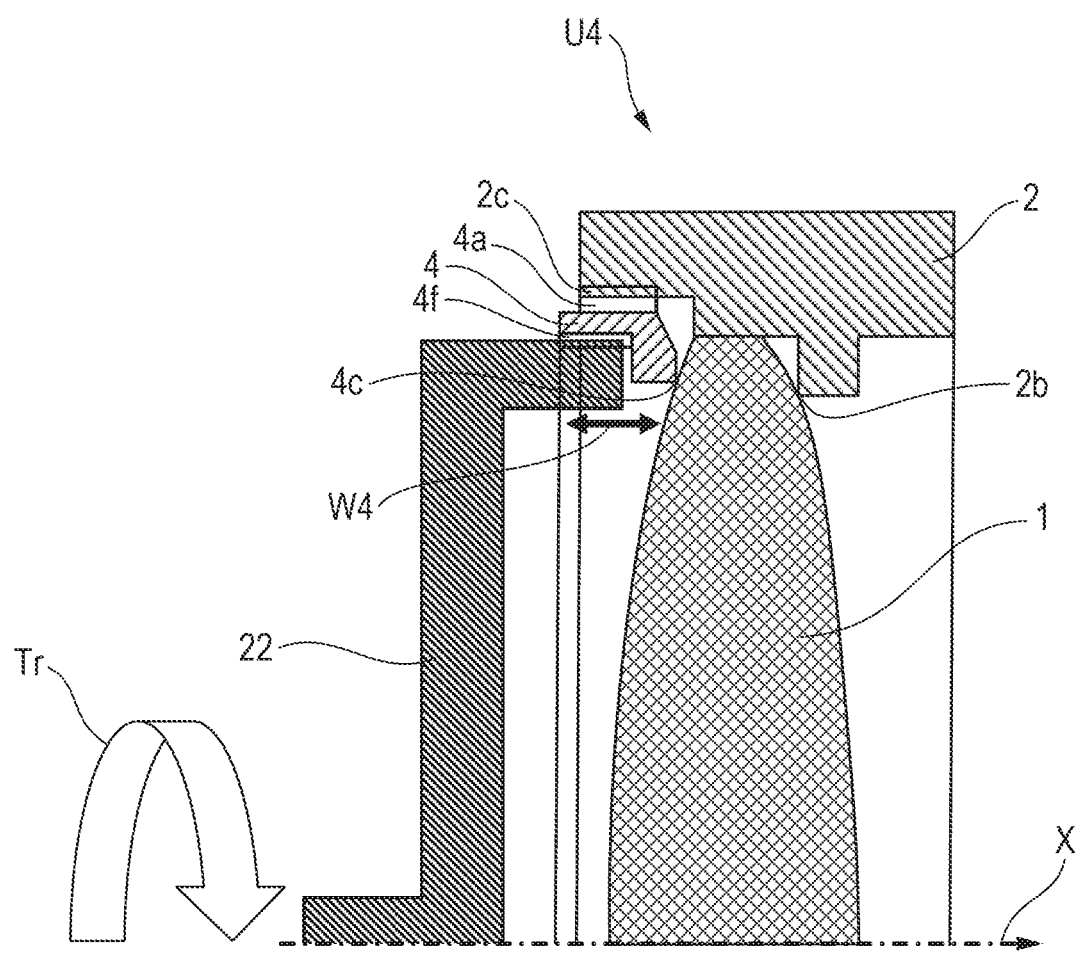
FIG. 14 is a view illustrating a fastening tool relating to Embodiment 2.

Moreover, FIG. 14 is a view illustrating a fastening tool relating to Embodiment 2. In FIG. 14, the fastening tool 23 is configured such that portions (protruding portions) of the fastening tool 23 engage with the aforementioned groove portions 4f formed in the pressing ring 4. It is only necessary to apply the fastening torque Tr to the fastening tool 23 in this engagement state. The pressing ring 4 is thereby screwed to the lens barrel 2 and the contact portion 4c of the pressing ring 4 comes into contact with the lens 1. The lens 1 is thus pressed against the lens barrel 2 (held between the contact portion 4c and the contact portion 2b of the lens barrel 2) and is firmly held by the lens barrel 2.

Note that the fastening tool relating to Embodiment 3 (FIG. 8) may be the same as the fastening tool 20 described in Embodiment 1 as described above.

Note that, although the fastening tool is described as a dedicated tool, the fastening tool is not limited to this. A general-purpose tool can be used as long as the tool can be applied to the pressing ring to be used. Moreover, the fastening for applying the fastening torque Tr can be performed manually, by using electric power, or in any other way, and may be performed by any publicly-known applicable means.

A below-described method of manufacturing an apparatus holding an optical element is also useful. The method can include a step of providing an optical element and the above-described holding apparatus which holds the optical element. The method further can include a step of engaging a fastening tool which fastens a pressing member that is screwed to the lens barrel to an engaging portion to fasten the pressing member by the fastening tool, and then pressing the optical element against the lens barrel by the pressing member in the axial direction of the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-256262, filed Dec. 28, 2016, and Japanese Patent Application No. 2017-238924, filed Dec. 13, 2017, which are hereby incorporated by reference herein in their entirety.

What is claimed is:

1. A holding apparatus which holds an optical element, the apparatus comprising:
   a lens barrel having an axis and including a first thread; and
   an annular pressing member including a second thread screwed with the first thread of the lens barrel and pressing the optical element against the lens barrel in a direction of the axis, wherein
   at least a part of an engaging portion is formed in a region of the annular pressing member opposite to a region of the second thread in a direction orthogonal to the direction of the axis, the engaging portion being configured to engage with a tool to rotate the annular pressing member and the lens barrel relative to each other with the first thread and the second thread screwed with each other.

2. The apparatus according to claim 1, wherein a hole, as the engaging portion, is formed in an outer surface of the annular pressing member along a radial direction of the annular pressing member.

3. The apparatus according to claim 1, wherein a groove, as the engaging portion, is formed in the annular pressing member along the direction of the axis.

4. The apparatus according to claim 3, wherein
   the annular pressing member includes an internal thread, as the second thread, screwed with the first thread of the lens barrel, and
   the groove is formed in an outer surface of the annular pressing member.

5. The apparatus according to claim 3, wherein
   the annular pressing member includes an external thread, as the second thread, screwed with the first thread of the lens barrel, and
   the groove is formed in an inner surface of the annular pressing member.

6. The apparatus according to claim 1, wherein the annular pressing member includes a projecting portion, as the engaging portion, projecting in a radial direction of the annular pressing member.

7. The apparatus according to claim 6, wherein
   the annular pressing member includes an internal thread, as the second thread, screwed with the first thread of the lens barrel, and
   the projecting portion is formed in an outer surface of the annular pressing member.

8. An optical apparatus comprising:
   an optical element; and
   a holding apparatus which holds the optical element, the holding apparatus comprising:
   a lens barrel having an axis and including a first thread; and
   an annular pressing member including a second thread screwed with the first thread of the lens barrel and pressing the optical element against the lens barrel in a direction of the axis, wherein
   at least a part of an engaging portion is formed in a region of the annular pressing member opposite to a region of the second thread in a direction orthogonal to the direction of the axis, the engaging portion being configured to engage with a tool to rotate the annular pressing member and the lens barrel relative to each other with the first thread and the second thread screwed with each other.

9. The apparatus according to claim 8, further comprising an image pickup element configured to receive an image formed via the optical element.

10. A method of manufacturing an apparatus which holds an optical element, the method comprising steps of:
    preparing the optical element and a holding apparatus which holds the optical element, the holding apparatus including:
    a lens barrel having an axis and including a first thread; and
    an annular pressing member including a second thread screwed with the first thread of the lens barrel and pressing the optical element against the lens barrel in a direction of the axis, wherein
    at least a part of an engaging portion is formed in a region of the annular pressing member opposite to a region of the second thread in a direction orthogonal to the direction of the axis, the engaging portion being configured to engage with a tool to rotate the annular pressing member and the lens barrel relative to each other with the first thread and the second thread screwed with each other; and
    fastening the annular pressing member to the lens barrel with the tool, with the engaging portion engaging with the tool, to press the optical element against the lens barrel with the annular pressing member in the direction of the axis.

* * * * *